United States Patent [19]
d'Entremont et al.

[11] 3,947,267
[45] Mar. 30, 1976

[54] PROCESS FOR MAKING STAINLESS STEEL

[75] Inventors: John C. d'Entremont, Middletown; Charles R. Taylor, Trenton, both of Ohio

[73] Assignee: Armco Steel Corporation, Middletown, Ohio

[22] Filed: June 19, 1974

[21] Appl. No.: 480,846

Related U.S. Application Data

[63] Continuation-in-part of Ser. No. 381,687, July 23, 1973, abandoned.

[52] U.S. Cl.................................. 75/130.5; 75/11
[51] Int. Cl.².......................................... C21C 5/52
[58] Field of Search...................... 75/130.5, 11, 12

[56] References Cited
UNITED STATES PATENTS

| | | | |
|---|---|---|---|
| 3,495,971 | 2/1970 | Ban......................................... | 75/11 |
| 3,728,101 | 4/1973 | Entremont............................. | 75/11 |

*Primary Examiner*—Peter D. Rosenberg
*Attorney, Agent, or Firm*—Melville, Strasser, Foster & Hoffman

[57] ABSTRACT

An economical process for making a molten ferrous alloy containing from about 5.0% to about 30.0% by weight chromium and from 0% up to about 25.0% by weight nickel. The process comprises four basic operations:

1. partially reducing chrome ore and iron ore and (depending upon the type or reducing process used) converting the ores before, during or after the reducing step into an appropriate physical form for charging into a submerged-arc furnace;

2. preparing a charge consisting primarily of the reduced chrome and iron ores (preferably still hot from the reducing step) and smelting and reducing this charge by the submerged-arc process in a first vessel to yield an unrefined chrome alloy high in carbon and silicon;

3. transferring the molten alloy from the first vessel to a second vessel and directing gaseous oxygen thereagainst to reduce the carbon and silicon content thereof; and 4. thereafter introducing a mixture of gaseous oxygen and an inert gas or nitrogen into the molten alloy in the second vessel below the surface of the alloy to complete the refining and to minimize the loss of chromium.

25 Claims, No Drawings

PROCESS FOR MAKING STAINLESS STEEL

CROSS REFERENCE TO RELATED APPLICATION

The present application is a continuation-in-part of the copending application Ser. No. 381,687, filed July 23, 1973, and now abandoned, in the name of the same inventors and entitled PROCESS FOR MAKING STAINLESS STEEL.

BACKGROUND OF THE INVENTION

1. Field of the Invention

The invention relates to an economical process for making molten ferrous alloy of the stainless steel type, and more particularly to such a process utilizing a charge consisting primarily of chrome and iron ores which have been partially reduced and converted to a suitable physical form for charging into a submerged-arc furnace.

2. Brief Description of the Prior Art

Heretofore, prior art workers have produced stainless steel through the use of an electric arc melting furnace, an oxygen converter or a combination of the two. These procedures have been further modified by the use of a vacuum in a degasser, ladle or other steel making vessel to assist in the removal of undesirable gases and to aid in the refining process.

The charge into the furnace or converter generally consisted of stainless steel scrap which had to have been segregated or classified prior to its use, carbon steel scrap, a small quantity of iron ore, fluxing agents and ferro-alloys. One of the primary ferro-alloys used was a ferro-chromium which could be of either the low or the high carbon variety. Ferro-chromium, particularly the low carbon variety, is an expensive source of chromium.

Through the years, improvements have been made in techniques, apparatus and atmosphere control. However, such improvements frequently resulted in new problems which had to be overcome. For the most part, the high cost of the charging ingredients and the labor costs for classifying scrap added considerably to the high refining and production costs of stainless steel. As a consequence, the use of stainless steel has been limited, despite the many advantages it has over carbon steel or low cost materials.

U.S. Pat. No. 3,728,101 made a significant contribution to the art because it teaches a process for the production of stainless steel utilizing an initial charge consisting primarily of iron ore and chrome ore. This charge is introduced into a first vessel and an unrefined liquid ferrous alloy is produced by means of a submerged-arc. The hot, liquid ferrous alloy is transferred to a second vessel and subjected to two gaseous treatments, the first comprising blowing pure gaseous oxygen against the liquid alloy and the second comprising the introduction of pure gaseous oxygen and an inert gas or nitrogen into the liquid alloy below the surface thereof. Finishing additions and temperature adjustments are made in the second vessel to achieve the desired final chemistry and tap temperature. When the steel is to have a nickel content, nickel is added during one or both of the gas purifying steps. When a high nickel content is desired, nickel may also be added to the submerged-arc furnace (first vessel).

A primary drawback of the process of U.S. Pat. 3,728,101 lies in the fact that a single first vessel in the form of a submerged-arc furnace cannot provide a sufficient output to economically charge the second vessel, generally in the form of a A/O vessel. Since chrome ores are considerably more difficult to reduce than iron ores, the normal size submerged-arc furnace, as known today, can be relied upon to produce only about five tons or less per hour of the unrefined alloy. The typical A/O vessel requires a charge in the neighborhood of about 20 tons per hour. Therefore, to practice the process of U.S. Pat. 3,728,101 properly, the output of some four or five submerged-arc furnaces are required to charge the typical A/O vessel (i.e. the second vessel).

The present invention constitutes an improvement in the process of the above mentioned U.S. Pat. 3,728,101 in that it renders the process of that patent economically more feasible. In accordance with the present invention, the iron and chrome ores making up the primary portion of the charge to the first vessel (submerged-arc furnace) are pre-reduced and rendered in an appropriate physical form for charging into the submerged-arc furnace. As will be discussed hereinafter, this pre-reduction step can be accomplished in a number of well known ways.

Together with the pre-reduction step, the present invention contemplates rendering the chrome and iron ores in a physical form appropriate for charging into a submerged-arc furnace. By "appropriate form" is meant that the ores should be intimately mixed and should not contain significant amounts of powder or fines. To this end, briquetting, nodulizing, pelletizing and sintering (all of which are well known in the art) may be employed. For purposes of the present specification and the claims hereafter, the generic term "agglomeration" will be used and is intended to include all of the methods listed above. In some instances, sized ores may be employed in the submerged-arc furnace. While, as will be appreciated by one skilled in the art, sizing is not truly an agglomeration procedure, for purposes of the present specification and claims the term "agglomeration" is to be construed broadly enough to include sizing.

As will be developed further hereinafter, the agglomeration of the ores may be accomplished before, during or after the pre-reduction step. Some pre-reduction methods require the use of previously agglomerated ores. Other pre-reduction methods utilize a fluidized bed, and agglomeration is accomplished after the pre-reduction step. Yet other pre-reduction methods result simultaneously in the agglomeration of the ores as a part of the pre-reduction procedure.

The pre-reduction of the chrome and iron ores should be as complete as possible, consistent with optimal time and economic considerations. As indicated above, it is known that iron ores will reduce before chrome ores thermodynamically. The present invention contemplates a pre-reduction of iron ores of up to about 95% or more and a pre-reduction of the chrome ores of from about 20% to about 60% or more.

The practice of the present invention provides advantages in addition to rendering the process of U.S. Pat. 3,728,101 more economic. First of all, the present process enables the use of low grade chrome ores (having a chrome to iron ratio of 3.5 or less) such as Transvaal type ores, hitherto deemed undesirable. The practice of the present invention places such typically friable low grade chrome ores in an improved form for the submerged-arc furnace. Such low grade chrome ores are easier to mine, available in greater quantities than high grade chrome ores and are far less expensive. The present invention enables the use of these low grade ores for up to 100% of the chrome requirements. As a consequence, the present process enables more economical use of more raw materials and less scrap.

The operation of a submerged-arc electric furnace is expensive. Through the practice of the present invention, depending upon the type of pre-reduction step used, the ores may be charged into the submerged-arc furnace already hot, thus reducing the operating cost of the furnace. As a result of the present invention, the productivity of the submerged-arc furnace (which operates on a continuous basis) is markedly increased. The process of U.S. Pat. 3,728,101 may be practiced utilizing only one or two submerged-arc furnaces for each A/O vessel.

SUMMARY OF THE INVENTION

The economical process of the present invention for making a molten, chrome bearing ferrous alloy comprises four basic operations. In the first operation, chrome and iron ores are pre-reduced as completely as possible, consistent with optimal time and economic considerations. These ores are also intimately mixed and rendered in a physical form appropriate for charging into a submerged-arc furnace.

In the second basic operation, the pre-reduced ores (preferably while still hot) are charged into a first vessel comprising a submerged-arc electric furnace. The partially reduced ores constitute the primary portion of the charge for the submerged-arc furnace, the balance being made up of carbonaceous fuels, fluxes and up to about 10% ferrous and/or alloy scrap. In the submerged-arc electric furnace, the reduction of the iron and the chrome ores is completed to form an unrefined liquid ferrous alloy still characterized by an excess of carbon and silicon.

The unrefined liquid ferrous alloy is transferred, while still liquid, from the submerged-arc electric furnace to a second vessel (generally an A/O vessel) and is subjected therein to two gaseous treatments constituting the third and fourth basic operations mentioned above. In the third operation, oxygen is top blown against the liquid alloy to partially reduce the silicon and carbon contents therein. This operation is continued until the carbon has been reduced to less than about .20% by weight. Immediately thereafter top blowing is discontinued and the fourth operation is begun. This operation comprises finishing and refining by the introduction of gaseous oxygen and an inert gas or nitrogen into the liquid alloy below the surface thereof to bring the carbon content to the desired final level. Finishing additions and temperature adjustments are made to meet the desired final chemistry and tap temperature. The desired nickel content is added in any one or a combination of the third or fourth steps. To achieve a high nickel content nickel may be added to the submerged-arc furnace also.

DESCRIPTION OF THE PREFERRED EMBODIMENTS

In the preferred practice of this invention, there is taught a process for producing a molten ferrous alloy containing from about 5.0% to about 30.0% by weight (and preferably from about 10.0% to about 18.0% by weight) chromium and up to about 25.0% by weight (and preferably up to about 12.0% by weight) nickel, in an economical manner. As will be evident hereinafter, other elements such as carbon and silicon are present and play an important role in the process. Various impurities may be present, as will be discussed hereinafter. Finally, some elements constitute useful alloy additions to the stainless steel, but they are generally not present in the initial chemistry. Many of these elements, such as manganese, for example, will suffer some losses during the processing and may be more efficiently added as a ferro-alloy at the end of the refining process.

The process of the present invention is made up of four basic operations. The first operation entails pre-reduction and the rendering of the chrome and iron ores into an appropriate form for charging into a submerged-arc furnace. As indicated above, the agglomeration of the ores may be accomplished by briquetting, nodulizing, pelletizing, sintering and, in some instances, by a simple sizing procedure. All of these processes are well known in the art and the selection of an appropriate process is well within the skill of the worker in the art and will depend upon a number of factors including the type of pre-reduction process practiced. Many of the above noted agglomeration procedures utilize an appropriate binder to hold the material together in the desired shape and size. The most common binders employed include bentonite, cement and lime.

The pre-reduction step may be performed by any appropriate method capable of producing a continuous supply of reduced material for feed to the submerged-arc furnace. For example, the reduction may be accomplished by the direct reduction process taught in co-pending application Ser. No. 333,673, filed Feb. 20, 1973, in the names of Clyde L. Cruse, Jr. and Arthur P. Kerschbaum and entitled METHOD AND APPARATUS FOR THE DIRECT REDUCTION OF IRON ORES. In accordance with this application previously agglomerated or sized ores are subjected to gaseous reduction whereby a steam-hydrocarbon fluid mixture, having a steam : carbon molar ratio ranging from 0.9:1 to 1.8:1, is catalytically reformed to produce a reducing gas mixture containing about 85% to 98% by volume carbon monoxide plus hydrogen, with a hydrogen : carbon monoxide volume ratio of at least 2:1. The reducing gas is transferred directly at elevated temperatures to a shaft furnace for reduction of ores therein and the spent reducing gas is cleaned, cooled and dried, for use as a fuel and coolent.

Pat. No. 3,375,099 is exemplary of processes utilizing a shaft furnace and not employing catalytic reformation. In this patent, pre-agglomerated ores are introduced to a shaft furnace and travel counter-current to a reducing gaseous atmosphere introduced at about the longitudinal center of the furnace and generated by the incomplete combustion of a mobile fuel with oxygen. As these gases travel upwardly of the furnace they are withdrawn, cooled and much of their water content is condensed. These gases may have a methane-containing gas mixed with them and are reintroduced into the shaft furnace below its mid-section to cool the reduced ore pellets. U.S. Pat. No. 3,148,059 teaches the use of a shaft reducing furnace and a reducing gas obtained by cracking hydrocarbons with steam or oxygen in cracking furnaces. The cracking is carried out in the presence of waste gas collected from the shaft furnace. Again, the process of this patent requires pre-agglomerated ores.

U.S. Pat. No. 3,020,149 teaches the reduction of ores in a continuous flow, multiple stage, fluidized bed system wherein the ore travels counter-current to the flow of hot reducing gases. U.S. Pat. No. 3,126,276 also teaches a method of reducing ores in a fluidizing-solids reactor by means of a reducing gaseous mixture at elevated temperature. Since both of the last mentioned patents utilize a fluidized bed, it will be understood that for purposes of the present invention, agglomeration would have to be performed after the reducing step.

U.S. Pat. No. 3,458,307 teaches the process for reducing ores in the upper portion of a blast furnace by a gaseous mixture consisting essentially of carbon monoxide and hydrogen at high temperature. Top gases from the blast furnace are collected, cooled and cleaned. A portion of the top gases are enriched with a hydrocarbonaceous fluid fuel and heated to produce carbon monoxide and hydrogen. The carbon monoxide and hydrogen are introduced into the reduction zone of the blast furnace at elevated temperature. To utilize a system such as this, it would be necessary to remove the reduced ores from the blast furnace prior to melting. This process contemplates the use of pelletized, sintered or sized ores.

U.S. Pat. No. 3,167,420 teaches a method of producing alloys from ore in an electric arc furnace. Agglomerated ores are pre-reduced in the upper portion of the electric arc furnace or in an adjacent chamber by mixing air with the furnace gases and burning the furnace gases.

All of the pre-reducing methods described above are exemplary of methods which may be utilized in the first step of the present invention. Adaptation of these methods is well within the skill of the worker in the art. As indicated above, the reduction of both the chrome and iron ores should be as complete as possible, consistent with optimal time and economic considerations. Some of the processes set forth above require agglomeration of the ore prior to reduction. Others require agglomeration of the ore after reduction. In most instances it is preferable to use a pre-reduction method which will provide a constant feed for the submerged-arc furnace, the feed still being hot from the pre-reduction step.

For purposes of an exemplary showing, the present invention will be described in terms of the use of a continuously operated rotary kiln for the accomplishment of the pre-reduction step. While the rotary kiln may be charged with agglomerated ores, it may also be charged with non-agglomerated chrome ore and iron ore together with a suitable source of carbon to serve as a fuel and reductant. As indicated above, the chrome ore may be of the low grade variety. The fuel is preferably reactive and non-caking, as for example, sub-bituminous coals. The ores and the fuel are intimately mixed. The two types of ores and the carbon source material are so proportioned as to achieve as complete a reduction of both types of ores as possible, consistent with optimal economics, time and like considerations. Reduction in the kiln is achieved at a temperature of from about 1800° F to about 2400° F.

As a result of their treatment in the kiln, the iron and chrome ores will agglomerate so as to be in an improved form for subsequent charging into the submerged-arc furnace. In the product from the kiln, it is desirable that the iron ores will be pre-reduced up to 95% or more and the chrome ores will be pre-reduced from 20% to 60% or more. The carbon content of the kiln product will depend upon the amount of reduction of the two types of ores accomplished. The remainder of the kiln product will comprise unreduced residual oxides contained in the gangue of the ores and the ash of the carbon source. Optionally, up to 20% by weight silica may be added to the material in the kiln to promote agglomeration, to flux metallic oxides and to provide protection against re-oxidation of reduced metallics in the rotary kiln operation. An appropriate binder material may also be added.

The remaining three basic operations of the present invention are substantially identical to those taught in U.S. Pat. 3,728,101. To this end, the partially reduced product of the kiln (or other reducing process) is charged into a first vessel comprising a submerged-arc electric furnace. Typically, the product of the kiln will comprise at least 65% of the charge to the submerged-arc electric furnace, the balance being made up of carbonaceous fuels such as coke or the like and fluxes. Up to about 10% ferrous and/or alloy scrap may be used in this charge, so long as the alloy scrap has a chemistry approximating the chemistry of the desired final product.

The unrefined liquid ferrous alloy produced in the submerged-arc furnace, depending upon the desired chemistry of the final product within the ranges given above, will consist essentially of about 5.0% to about 30.0% by weight chromium, at least 3.0% by weight carbon and up to about 2.0% by weight silicon, the balance being essentially iron. As indicated above, the chromium content will be determined by properly proportioning the chrome ores and iron ores in the charge in the kiln (or other reducing apparatus). When required some additional adjustments in the chemistry of the liquid alloy may be made via the charge to the submerged-arc furnace.

Silicon will normally be present in the unrefined liquid ferrous alloy formed in the submerged-arc furnace in amounts between about 0.5% to about 2.0% by weight. Sufficient silicon may be present in the initial ores, added to the pre-reduction step or it may be added to the charge of the submerged-arc furncace in the form of quartzite or ferro-silicon. The silicon is reduced in the submerged-arc furnace and serves as a supplemental source of fuel. Generally, the final stainless alloy product will contain less than about 1.0% by weight silicon so that most of the silicon ends up as calcium silicates in the slag formed as a result of the flux or limestone additions in the second vessel.

As is typical with most steelmaking processes, there are various impurities which will be picked up or are present from the materials charged into the submerged-arc furnace. However, the ability to control these impurities to rather low levels in the smelting process of the submerged-arc furnace contributes significantly to its value. For example, sulfur may be reduced to a much lower value than is normally attained by prior art practices.

A slag will be formed in the submerged-arc furnace. This slag will consist essentially of magnesia, alumina and lime and is ultimately discarded.

The unrefined liquid ferrous alloy of the submerged-arc electric furnace is tapped at a temperature of between about 1520° C to about 1630° C. The alloy is transferred directly to a second vessel where gaseous oxygen, by means of a lance, is directed to a position just above the surface of the alloy to decarburize it to about 0.10% to about 0.20% by weight carbon. Concurrently, the silicon content is reduced to about 0.02% to about 0.04% by weight. This blowing of the alloy with gaseous oxygen comprises the third basic operation of the present invention. The precise low level of carbon reached during this operation, without substantial loss of chromium, depends upon the final chromium level desired and the temperature.

During this third operation a slag will be formed in the second vessel. This slag will consist essentially of iron oxide, silica, lime and limited amounts of chrome oxide.

As the fourth basic operation of the present invention, and to finish the refining of the alloy, the oxygen lance is lowered below the surface of the alloy and the gaseous oxygen is supplemented with an inert gas; the ratio of the oxygen-inert gas mixture ranging between about 3/1 and 1/5. While argon is the preferred inert gas for this operation, it should be understood that other inert gases such as neon, crypton, xenon and helium may be used. Nitrogen may also be used particularly when a high nitrogen content stainless steel is desired. This fourth basic operation is continued until the carbon is further reduced to the desired final level.

It is not critical to the invention to inject the oxygen-inert gas (or nitrogen) mixture into the liquid alloy by means of a lance lowered through the slag and into the molten bath. The gaseous mixture may come from fixed annular submerged tuyeres disposed near the base of the second vessel.

In the practice of the third and fourth operations the oxygen used may be pure oxygen or the somewhat less pure, commercially available oxygen used for such purposes as is well known in the art. The term "oxygen" is not, however, intended to include air.

As the desired level of carbon is reached, alloying additions may be made and the temperature adjusted for tapping into a suitably prepared ladle. In those situations where it may be necessary to recover alloying elements such as chromium from the slag blanket, reducing agents such as ferro-silicon, and fluxes such as lime and spar may be added. This, however, is a practice well known in the steel making art and does not require further description.

When making a nickel-bearing stainless steel, while some of the desired final nickel content may be achieved in the submerged-arc furnace through the use of nickel-bearing scrap, the final nickel content is achieved by nickel additions made during the third or fourth operations or both. In either instance the nickel additions serve as a coolant. Nickel may be added in the form of nickel oxide, electrolytic nickel, nickel pigs or high-nickel scrap. As the desired nickel content of the final product increases, a larger proportion of the required nickel should be added to the submerged-arc furnace.

It can be seen from the above that the process of the present invention combines the teachings of the above noted U.S. Pat. 3,728,101 with an initial operation wherein chromite and iron ores are partially reduced and rendered into a form suitable for charging into the submerged-arc furnace. Through appropriate charging of the kiln (or other reducing apparatus) and the submerged-arc electric furnace, the unrefined liquid ferrous alloy of the submerged-arc electric furnace will have a composition very close in chromium content to the desired final product. The final product is produced without unnecessary loss of heat units, the hot pre-reduced ores (where possible) being employed in the first vessel comprising the submerged-arc electric furnace and unrefined liquid ferrous alloy therefrom being transferred directly and without cooling to the second vessel for the gas refining operations.

Modifications may be made in the invention without departing from the spirit of it.

The embodiments of the invention in which an exclusive property or privilege is claimed are defined as follows:

1. In a process for making molten ferrous alloys containing from about 5.0% to about 30.0% by weight chromium, and up to about 25.0% by weight nickel and comprising the steps of introducing into a first vessel a charge consisting essentially of chrome ore, iron ore and a source of carbon, smelting said charge in said vessel by means of a submerged arc to provide an unrefined liquid ferrous alloy consisting essentially of about 5.0% to 30.0% by weight chromium, at least 2.0% by weight carbon, up to about 2.0% by weight silicon, the balance being essentially iron, transferring said liquid ferrous alloy from said first vessel to a second vessel, top blowing pure gaseous oxygen against said liquid alloy in said second vessel to partially reduce said silicon and carbon, continuing said oxygen blow until said carbon has been reduced to less than about 0.20% by weight, immediately thereafter finishing said refining by introducing gaseous oxygen and an inert gas or nitrogen into said liquid alloy below the surface thereof to bring the carbon content to the desired final level and making finishing additions and temperature adjustments to meet the desired final chemistry and tap temperature, the improvement comprising in combination therewith the steps of pre-reducing said chrome and iron ores prior to charging them into said first vessel and agglomerating said chrome and iron ores prior to charging them into said first vessel, said chrome ores being low grade chrome ores having a chrome to iron ratio of 3.5 and less and being usable for up to 100% of the chrome requirements, whereby said process may be practiced using one or two typical first submerged arc vessels for each typical second vessel.

2. The process claimed in claim 1 wherein said agglomerating step is practiced prior to said pre-reducing step.

3. The process claimed in claim 1 wherein said agglomerating step is practiced after said pre-reducing step.

4. The process claimed in claim 1 wherein said agglomerating and pre-reducing steps are practiced concurrently.

5. The process claimed in claim 1 wherein said iron ore is added to said chrome ore in such an amount as to achieve said desired final chrome content.

6. The process claimed in claim 1 wherein said iron ore is pre-reduced up to about 95% or more and said chrome ore is pre-reduced from about 20% to about 60% or more.

7. The process claimed in claim 1 including the steps of intimately mixing said chrome and iron ores with said source of carbon, heating and agglomerating said mixture and pre-reducing said ores thereof in a rotary kiln and introducing into said first vessel a charge consisting primarily of said heated and pre-reduced ores from said kiln.

8. The process claimed in claim 1 including the steps of intimately mixing and agglomerating said chrome and iron ores together with said source of carbon, charging said agglomerated material into a rotary kiln and heating and pre-reducing said ores therein, and introducing into said first vessel a charge consisting primarily of said heated and pre-reduced ores from said kiln.

9. The process claimed in claim 1 including the step of adding to said chrome and iron ores up to 20% by weight silica.

10. The process claimed in claim 1 including the step of adding nickel to said liquid alloy during at least one of said oxygen top blow and said introduction of oxygen and an inert gas or nitrogen below the surface of said liquid alloy to achieve said desired final nickel content.

11. The process claimed in claim 2 wherein said iron ore is pre-reduced up to about 95% or more and said chrome ore is pre-reduced from about 20% to about 60% or more.

12. The process claimed in claim 2 wherein said iron ore is added to said chrome ore in such an amount as to achieve said desired final chrome content.

13. The process claimed in claim 3 wherein said iron ore is pre-reduced up to about 95% or more and said chrome ore is pre-reduced from about 20% to about 60% or more.

14. The process claimed in claim 3 wherein said iron ore is added to said chrome ore in such an amount as to achieve said desired final chrome content.

15. The process claimed in claim 4 wherein said iron ore is pre-reduced up to about 95% or more and said chrome ore is pre-reduced from about 20% to about 60% or more.

16. The process claimed in claim 4 wherein said iron ore is added to said chrome ore in such an amount as to achieve said desired final chrome content.

17. The process claimed in claim 7 wherein said iron ore is pre-reduced up to about 95% or more and said chrome ore is pre-reduced from about 20% to about 60% or more.

18. The process claimed in claim 7 wherein said iron ore is added to said chrome ore in such an amount as to achieve said desired final chrome content.

19. The process claimed in claim 7 wherein said chrome and iron ores and said source of carbon are pre-reduced in said kiln at a temperature of from about 1800° F to about 2400° F.

20. The process claimed in claim 7 including the step of adding to said chrome and iron ores up to 20% by weight silica.

21. The process claimed in claim 8 wherein said iron ore is pre-reduced up to about 95% or more and said chrome ore is pre-reduced from about 20% to about 60% or more.

22. The process claimed in claim 8 wherein said iron ore is added to said chrome ore in such an amount as to achieve said desired final chrome content.

23. The process claimed in claim 8 wherein said chrome and iron ores and said source of carbon are pre-reduced in said kiln at a temperature of from about 1800° F to about 2400° F.

24. The process claimed in claim 8 including the step of adding to said chrome and iron ores up to 20% by weight silica.

25. The process claimed in claim 10 including the step of adding nickel to said charge of said first vessel.

* * * * *